US012536402B2

(12) United States Patent
Mermoud et al.

(10) Patent No.: US 12,536,402 B2
(45) Date of Patent: Jan. 27, 2026

(54) USING CHATBOTS TO COLLECT DIRECT USER FEEDBACK ON APPLICATION EXPERIENCE

(71) Applicant: Cisco Technology, Inc., San Jose, CA (US)

(72) Inventors: Grégory Mermoud, Venthône (CH); Jean-Philippe Vasseur, Saint Martin d'Uriage (FR); Andrea Di Pietro, Frejus (FR); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/971,294

(22) Filed: Oct. 21, 2022

(65) Prior Publication Data

US 2024/0137293 A1 Apr. 25, 2024
US 2024/0235963 A9 Jul. 11, 2024

(51) Int. Cl.
*G06N 3/006* (2023.01)
*G06F 9/50* (2006.01)
*G10L 15/22* (2006.01)
*H04L 41/5061* (2022.01)
*H04L 41/5067* (2022.01)
*H04L 51/02* (2022.01)

(52) U.S. Cl.
CPC ............ *G06N 3/006* (2013.01); *G06F 9/5027* (2013.01); *G10L 15/22* (2013.01); *H04L 41/5064* (2013.01); *H04L 41/5067* (2013.01); *H04L 51/02* (2013.01)

(58) Field of Classification Search
CPC ........ G06N 3/006; G06N 3/082; G06N 20/00; G06F 15/76; G06F 16/248; G06F 40/226; G06F 40/211; G06F 40/56; G06F 40/30; G06F 16/3344; G06F 40/268; G06F 40/35; G06F 3/167; G06F 9/5027; G06F 9/5077; G10L 15/22; G10L 15/18; G10L 15/01; H04L 41/046; H04L 43/087; H04L 43/0829; G06K 19/0723
See application file for complete search history.

(56) References Cited

U.S. PATENT DOCUMENTS 10,783,188 B2  9/2020  Wang
11,062,231 B2  7/2021  Cagadas et al.
11,283,737 B2  3/2022  Parekh et al.
(Continued)

OTHER PUBLICATIONS

Katz, et al., "Bidirectional Forwarding Detection (BFD)", Request for Comments 5880, Jun. 2010, 49 pages, IETF Trust.

*Primary Examiner* — Kyung H Shin
(74) *Attorney, Agent, or Firm* — Lee & Hayes, P.C.

(57) ABSTRACT

In one embodiment, a device associates one or more performance metrics with a particular session of an online application. The device makes a determination that a user of the online application associated with the particular session should be queried for feedback regarding their application experience. The device obtains, based on the determination, feedback from the user regarding their application experience, by causing a chatbot to be presented to the user and query the user for feedback regarding their application experience. The device associates the feedback from the user regarding their application experience with the one or more performance metrics.

18 Claims, 10 Drawing Sheets

(56) References Cited

U.S. PATENT DOCUMENTS

| | | | |
|---|---|---|---|
| 11,355,098 B1* | 6/2022 | Zhong | G10L 15/22 |
| 11,379,522 B2 | 7/2022 | Zade et al. | |
| 2018/0285759 A1* | 10/2018 | Wood | G06N 3/006 |
| 2019/0377791 A1* | 12/2019 | Abou Mahmoud | G06F 40/226 |
| 2020/0409761 A1* | 12/2020 | Stuntebeck | G06F 9/5027 |
| 2022/0237567 A1 | 7/2022 | Tiwari et al. | |

* cited by examiner

Messages | Profile  Content  Meetings  + Apps

How is your Webex call experience?

I am wondering whether you might be experiencing some difficulties right now. How has your experience been between 2022-07-05 15:10:00 and 2022-07-05 15:40:00?

How is your audio experience?

[ Average <> ]

How is your video experience?

[ Average <> ]

☐ The quality is unacceptable

Any other comments?

Submit

FIG. 6

USING CHATBOTS TO COLLECT DIRECT USER FEEDBACK ON APPLICATION EXPERIENCE

TECHNICAL FIELD

The present disclosure relates generally to computer networks, and, more particularly, to using chatbots to collect direct user feedback on application experience.

BACKGROUND

With the recent evolution of machine learning, predictive failure detection and proactive routing in a network now becomes possible through the use of machine learning techniques. For instance, modeling the delay, jitter, packet loss, etc. for a network path can be used to predict when that path will violate the service level agreement (SLA) of the application and reroute the traffic, in advance. However, doing so is also not without cost, as needlessly rerouting application traffic can also negatively impact the application experience of a user.

Testing has shown that network metrics are often poor proxies for the true, subjective application experience of a user. For instance, certain audio codecs for voice applications are now resilient to packet loss of up to 30%, meaning that significant path degradation may not even be noticeable by the user. In addition, simply garnering user feedback at the end of their application session (e.g., by asking the user to rate their videoconference experience on a scale of 0-5 stars) provides little useful information with respect to predicting when the application experience will be degraded, as the network conditions that led to the user rating their experience as 'poor' may have occurred at any point in time during their call.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example chatbot being presented to a user; and

DESCRIPTION OF EXAMPLE EMBODIMENTS

Overview

Figure 1A:
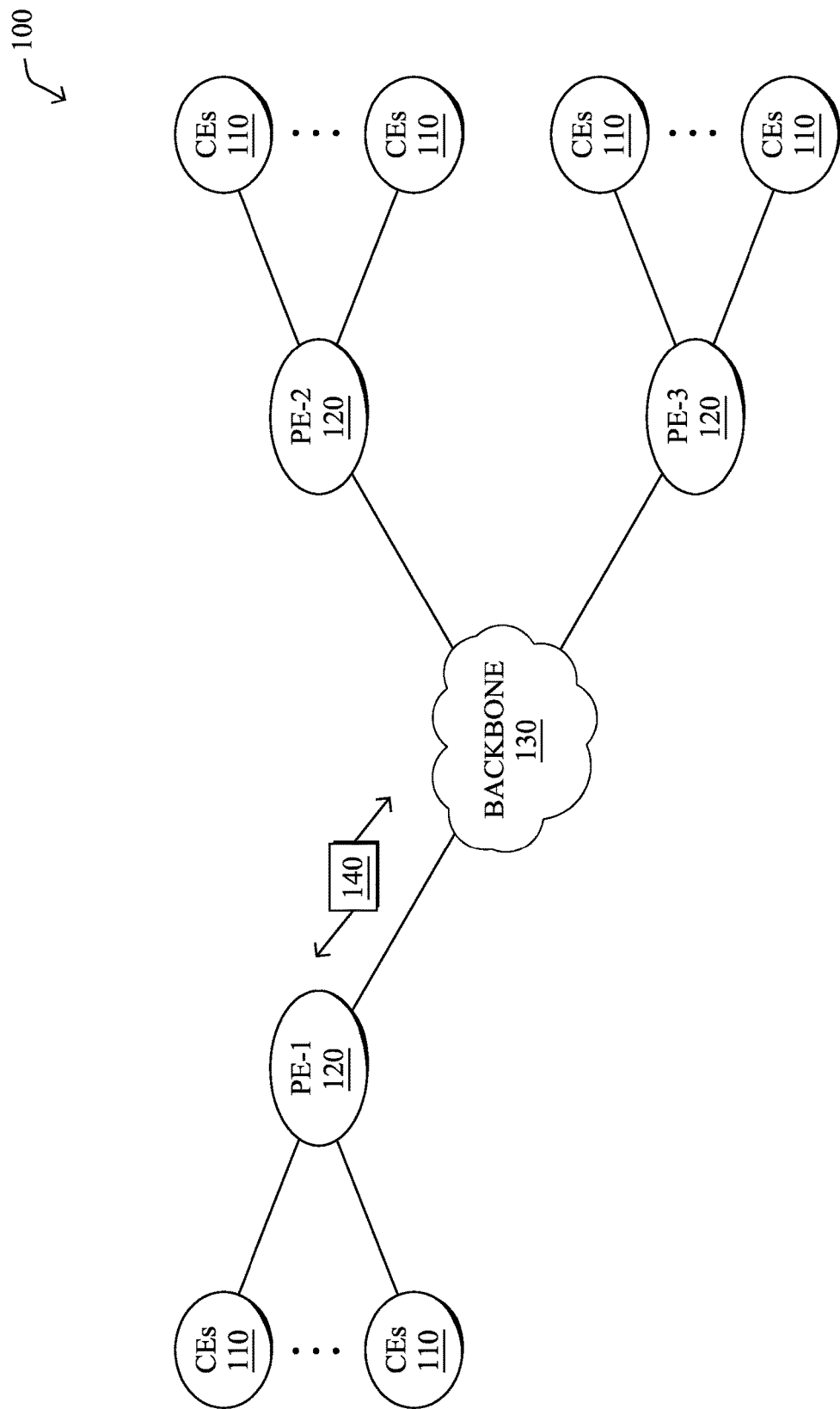
FIGS. 1A-1B illustrate an example communication network.

According to one or more embodiments of the disclosure, a device associates one or more performance metrics with a particular session of an online application. The device makes a determination that a user of the online application associated with the particular session should be queried for feedback regarding their application experience. The device obtains, based on the determination, feedback from the user regarding their application experience, by causing a chatbot to be presented to the user and query the user for feedback regarding their application experience. The device associates the feedback from the user regarding their application experience with the one or more performance metrics.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
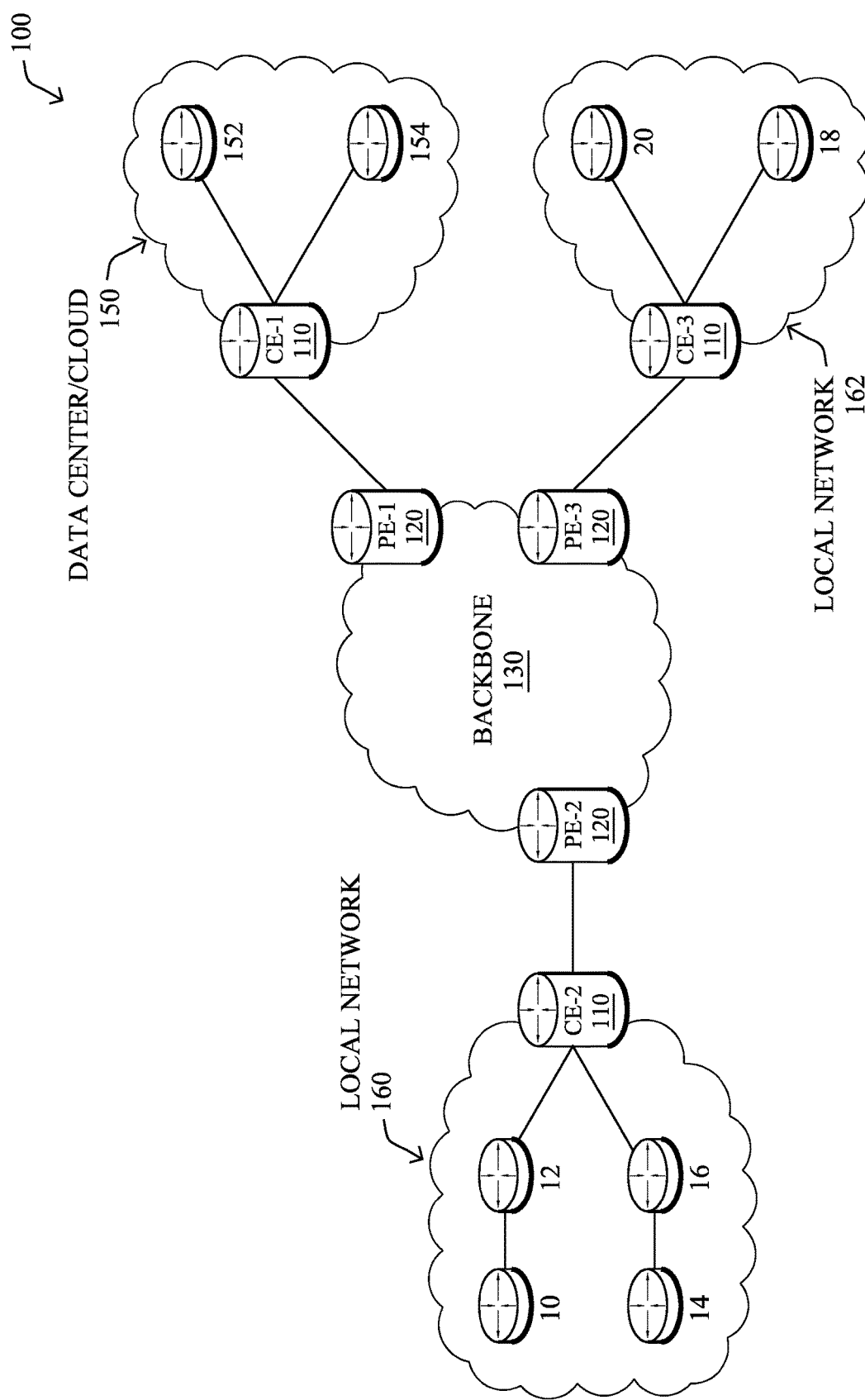

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
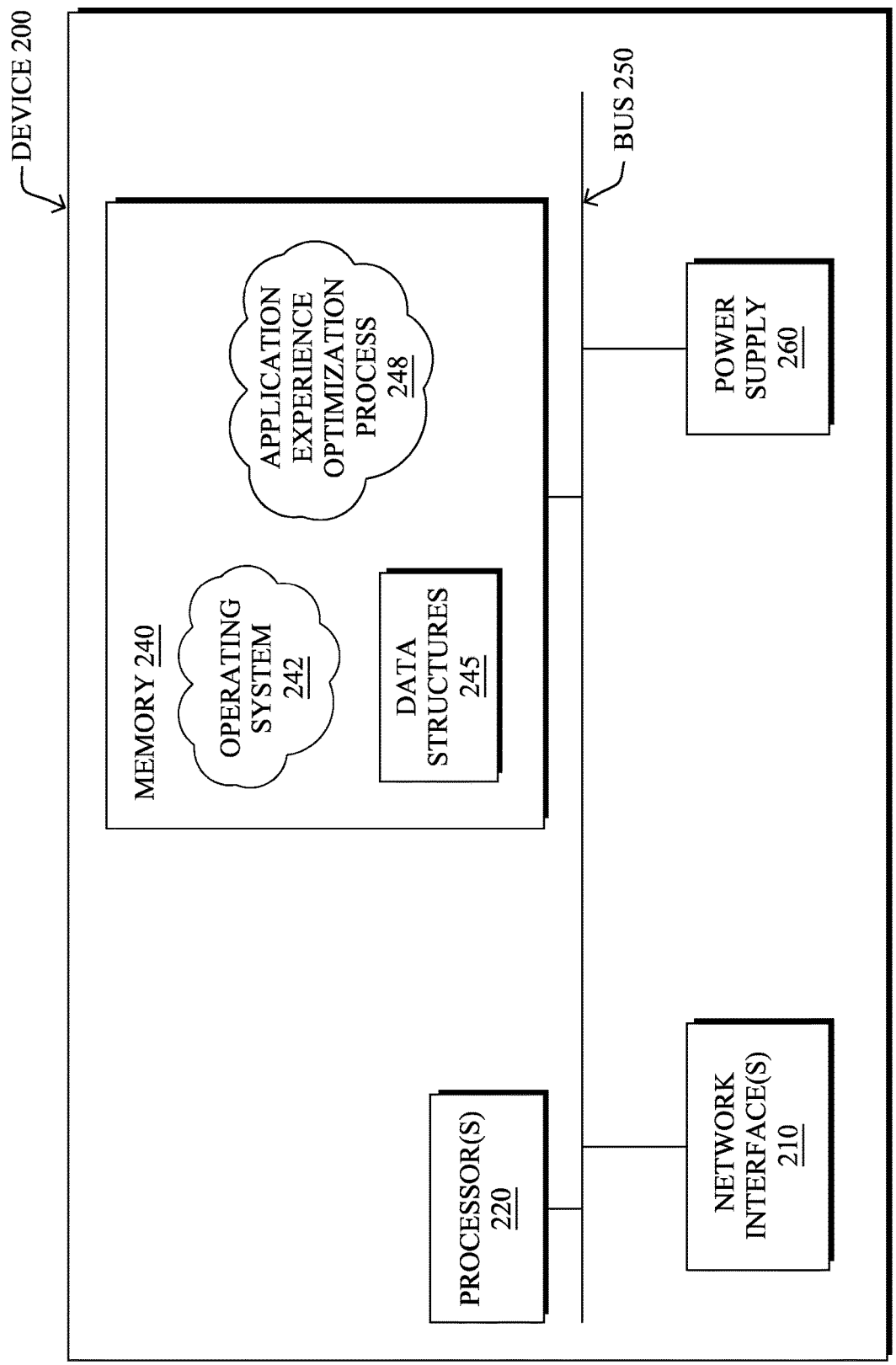
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
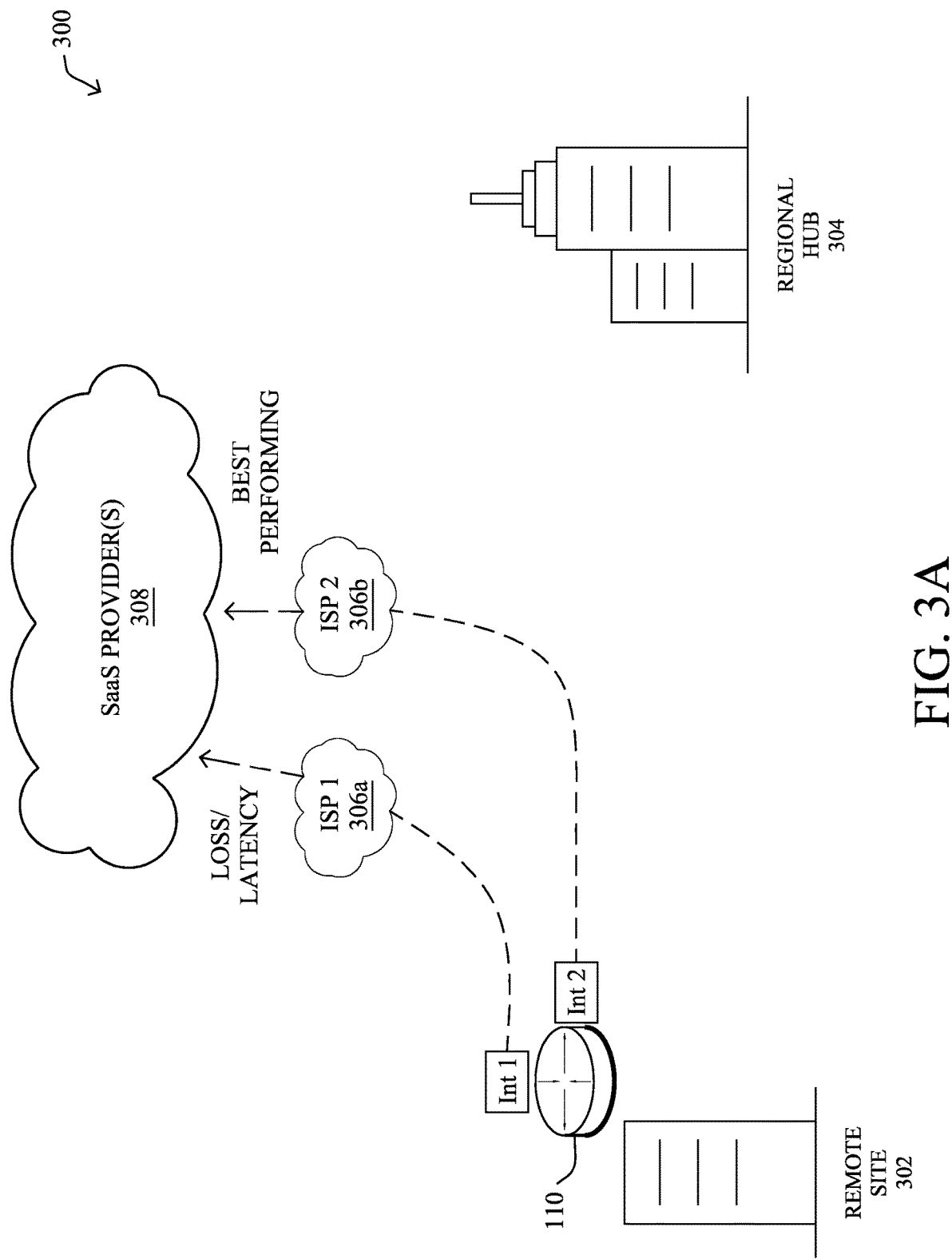
FIGS. 3A-3B illustrate example network deployments.
Figure 3B:
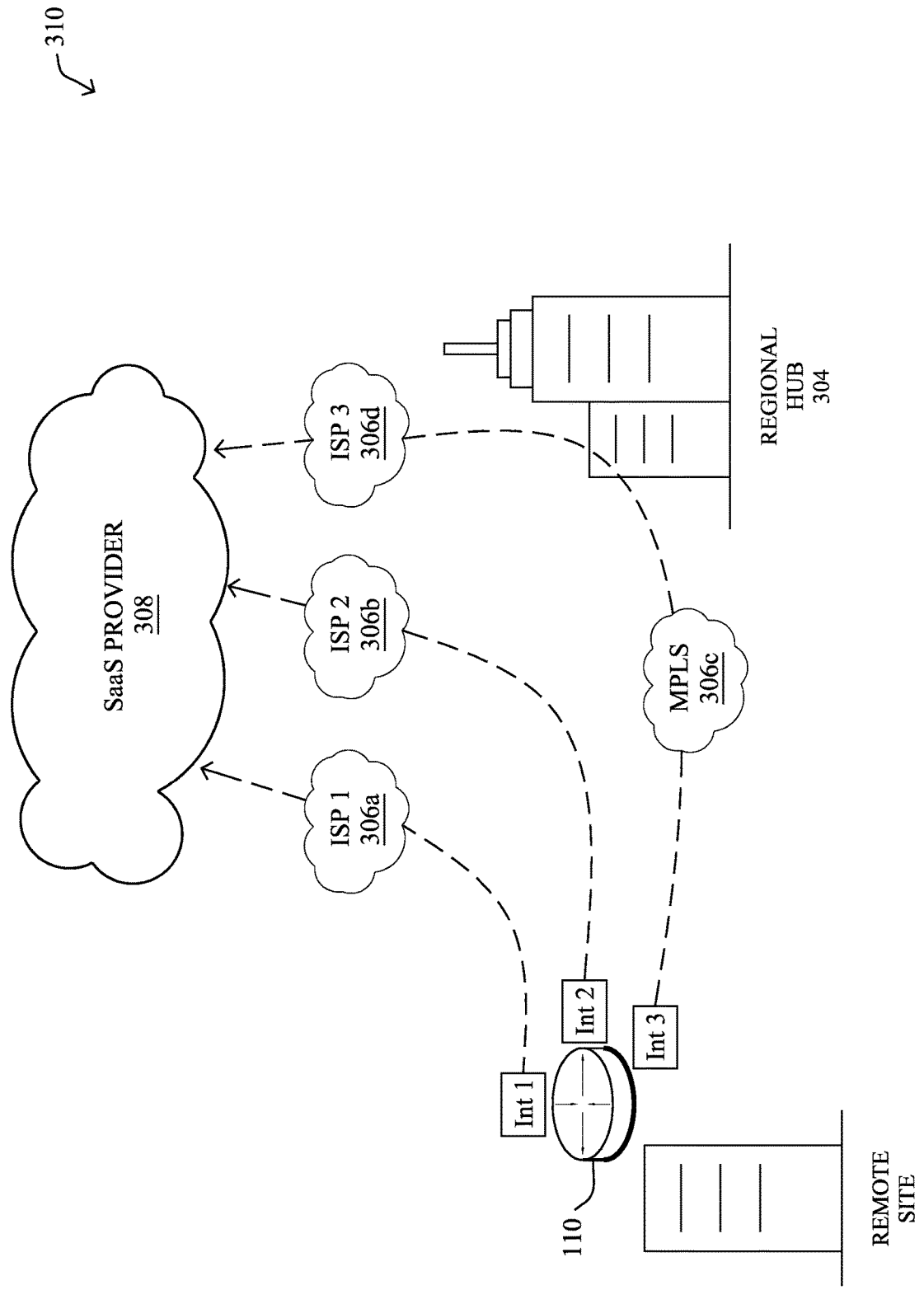

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MILS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
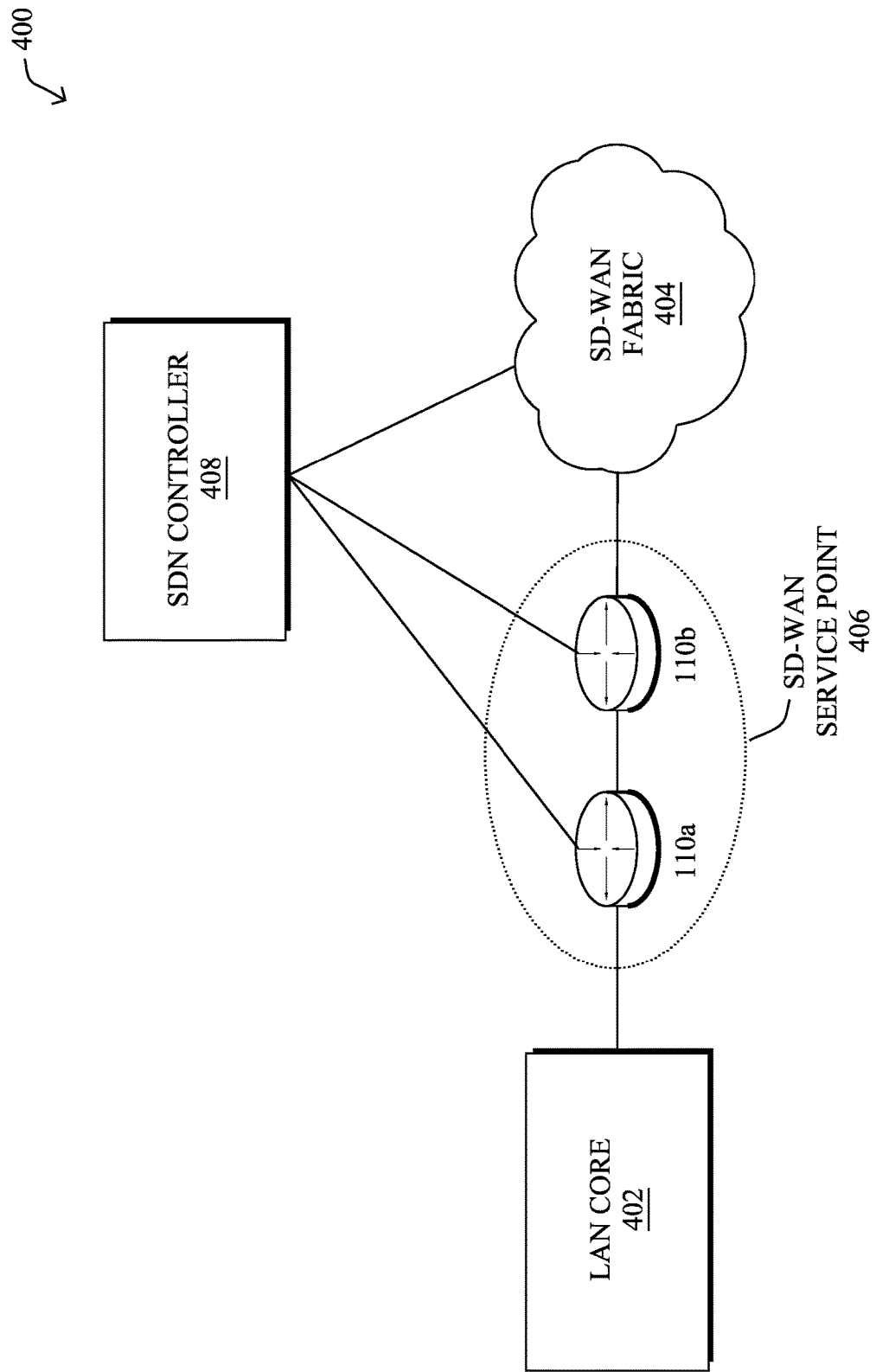
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast pith the notion of an informed decision, SLA failures are very common in the Internet and a good proportion of them could be avoided (e.g., using an alternate path), if predicted in advance.

Figure 4B:
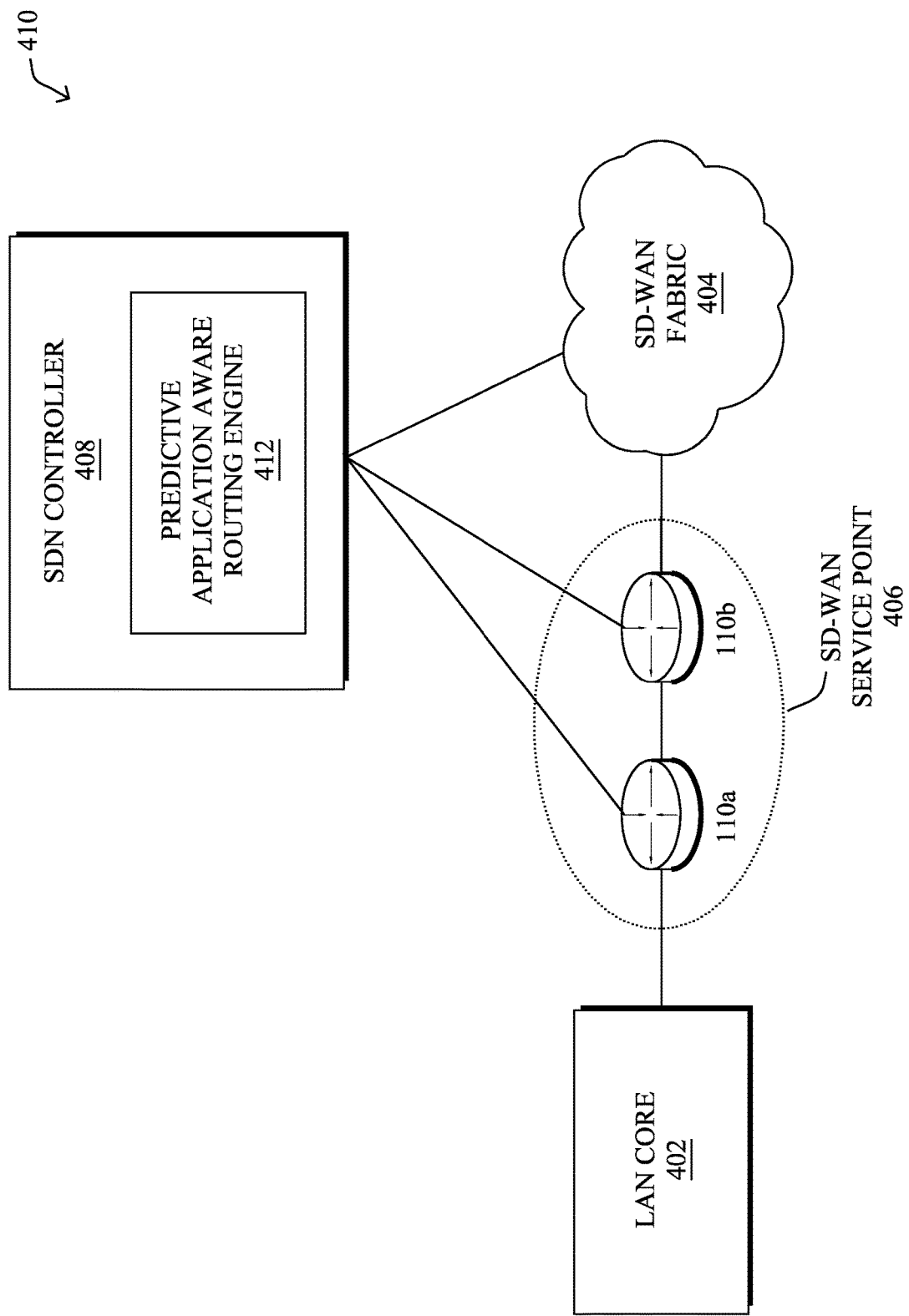

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Interne(thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, predictive networking engines, such as predictive application aware routing engine 412, seek to select the best path from among a plurality of paths $P_2, \ldots, P_N$ such that end users of a given online application, either SaaS-delivered (e.g., WebEx, Zoom, O365, Salesforce, SAP, etc.) or datacenter-hosted (and monitored via tools such as Datadog, AppDynamics, etc.) have the best experience possible. In the context of SD-WAN, these paths may be probed for liveness and basic path QoS metrics (e.g., loss, latency, jitter, throughput, etc.) at the network level (L3), typically using technologies such as Bidirectional Forwarding Detection (BFI)) probing.

However, actively probing the QoS metrics of the network paths reveals little about the actual experience of the end user. Indeed, while the path performance may be considered degraded from a networking perspective, an end user of an application may not even notice a change in their overall application experience (e.g., due to the codecs in use by the application, the ability of the application to adapt to network problems, etc.). As a result, networks today are primarily optimized using metrics such as mean opinion score (MOS) metrics, that are only vague approximations or proxies of what is thought to be the real end user experience. Furthermore, such proxies do not account at all for the inherently subjective nature of the application experience, which may be perceived differently by different users, and are not customized in any way to the individual end users. Said differently, there is a very poor understanding today of what the actual experience of an application user is.

Using Chatbots to Collect Direct User Feedback on Application Experience

The techniques introduced herein allow for the collection of direct user experience metrics for an online application via a chatbot, which may be integrated directly into the online application (e.g., Webex, Slack, WhatsApp hots, etc.). In some aspects, the prompting of the user for application experience feedback through the chatbot may be performed selectively, so as to maximize the amount of useful information garnered from the users of the application, while minimizing the intrusiveness of the chatbot on the users. In other words, the chatbot introduced herein may act as a relay between the network and end users of a given application, querying live feedback about their experience.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device associates one or more performance metrics with a particular session of an online application. The device makes a determination that a user of the online application associated with the particular session should be queried for feedback regarding their application experience. The device obtains, based on the determination, feedback from the user regarding their application experience, by causing a chatbot to be presented to the user and query the user for feedback regarding their application experience. The device associates the feedback from the user regarding their application experience with the one or more performance metrics.

Figure 5:
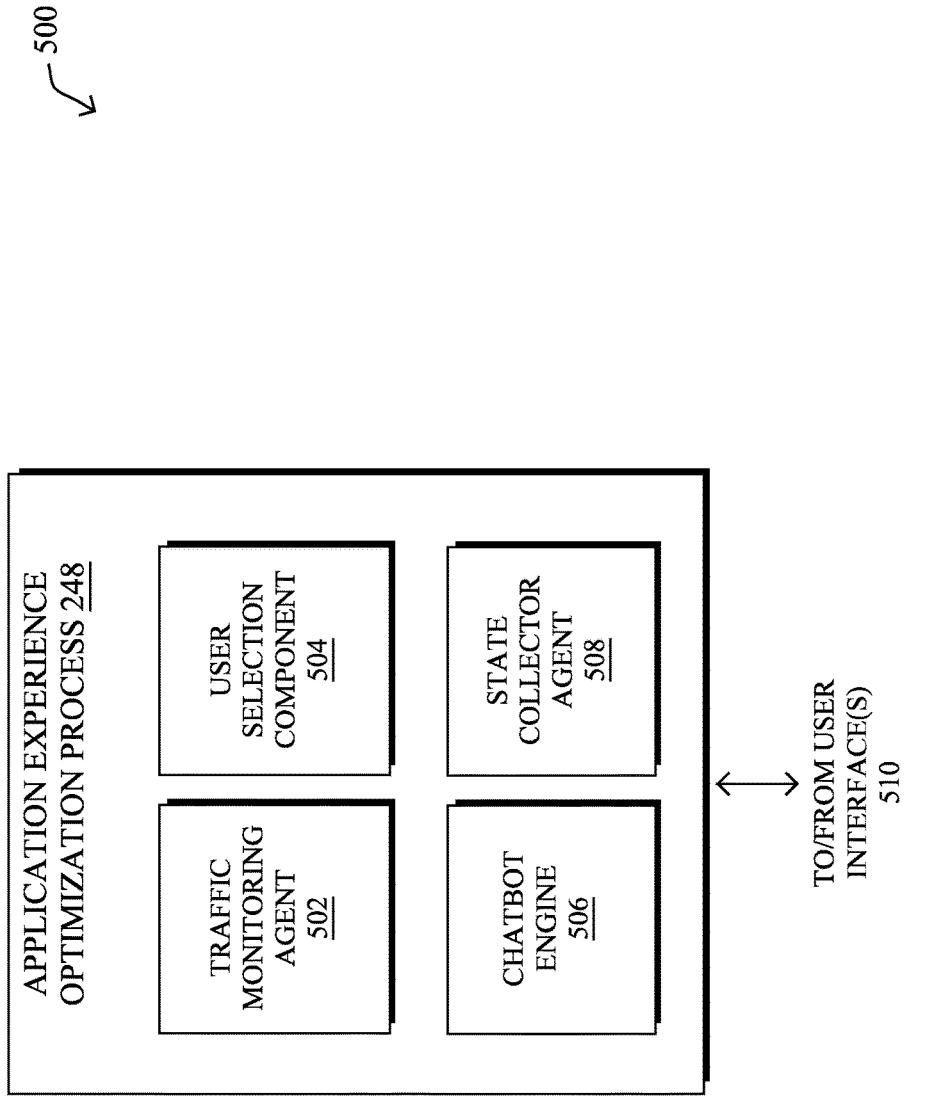
FIG. 5 illustrates an example architecture for using chatbots to collect direct user feedback on application experience.

Operationally, FIG. 5 illustrates an example architecture 500 for using chatbots to collect direct user feedback on application experience, according to various embodiments. At the core of architecture 500 is application experience optimization process 248, which may be executed by a controller for a network, a networking device, or another device in communication therewith. For instance, application experience optimization process 248 may be executed by a controller for a network (e.g., SDN controller 408 in FIGS. 4A-4B), a particular networking device in the network (e.g., a router, etc.), another device or service in communication therewith, or the like. In some embodiments, for instance, application experience optimization process 248 may be used to implement a predictive application aware routing engine, such as predictive application aware routing engine 412, or another supervisory service for the network. In other embodiments, application experience optimization process 248 may be used to implement a reactive routing approach in the network.

As shown, application experience optimization process 248 may include any or all of the following components: a traffic monitoring agent 502, a user selection component 504, a chatbot engine 506, and/or a state collector agent 508. As would be appreciated, the functionalities of these components may be combined or omitted, as desired (e.g., implemented as part of application experience optimization process 248). In addition, these components may be implemented on a singular device or in a distributed manner, in which case the combination of executing devices can be viewed as their own singular device for purposes of executing application experience optimization process 248.

During operation, traffic monitoring agent 502 may monitor the traffic of users of an online application in (near) real-time (e.g., continuously), in some embodiments. In general, the role of traffic monitoring agent 502 is to identify when users of a given online application are active and, optionally, obtain a (rough) assessment of the quality of service provided by the network for their sessions. To this end, traffic monitoring agent 502 may typically be hosted on a network device (a router, wireless LAN controller, etc.) or a network controller (e.g., DNA Center, vManage, etc.) and process network telemetry related to the application traffic and path QoS. For instance, such telemetry may take the form of NetFlow records, BFD probing results, IP-SLA information, or the like. In further embodiments, another form of telemetry that traffic monitoring agent 502 may obtain could be application-level metrics measured by the application itself. For instance, such application-level metrics may include metrics such as application-measured loss, latency, jitter, concealment time, codec statistics, audio/video bitrates, or the like. For instance, the application itself may provide this telemetry to traffic monitoring agent 502 via an application programming interface (API) or other mechanism. In some instances, traffic monitoring agent 502 may also be cloud-hosted and process the application-level telemetry, directly. Further embodiments provide for multiple traffic monitoring agent 502 to be implemented at different locations, as well.

Another potential function of traffic monitoring agent 502 is to provide custom messages to user selection component 504, based on the telemetry data that it obtained. In general, these messages may associate users of the online application with their corresponding network information, such as their IP addresses. Optionally, these messages may also include any or all of the telemetry obtained by traffic monitoring agent 502, or other information derived therefrom. For instance, traffic monitoring agent 502 may send a message to user selection component 504 that includes a score that estimates the application experience of a user (e.g., based on network-level metrics), a sample of the obtained telemetry, or the like.

In various embodiments, user selection component 504 may oversee the selection of users to be contacted by the chatbot regarding their application experiences. In its simplest embodiments, user selection component 504 may simply select the users randomly, possibly with a slight bias towards users that are likely to be subject to poor application experience (e.g., based on the information in the messages from traffic monitoring agent 502).

In further embodiments, user selection component 504 may base its selection of users to query regarding their experiences with the online application on any or all of the following criteria, among others:

Collection of feedback for network impairment scenarios that are poorly understood—In this case, user selection component 504 may maintain a mapping between network impairments and the corresponding feedback from users. In turn, user selection component 504 may bias its selection towards scenarios for which it has sparse feedback, or the existing feedback are contradictory. For example, user selection component 504 could be integrated with a network analytics tool, to detect a service degradation associated with a wireless access point. In that case, user selection component 504 may receive a list of application users connected to that access point at the time of the impairment that could be asked for feedback via a chatbot.

Selecting users that are predicted to have a very strong or very poor user experience—In this case, user selection component 504 may leverage some form of predictive model of the user experience, which takes as input the telemetry samples provided by traffic monitoring agent 502 and outputs a predicted application experience score for the application of interest. The goal of such a strategy may be to establish trust with the end users by showing that the network is aware of their problems or is confident in delivering a great experience.

Selecting users based on detection of specific events or configuration changes in the network—In this case, user selection component 504 may identify those users whose traffic may have been impacted by a certain network event or configuration change. For instance, a path change in the network (e.g., switching to a different SD-WAN from an Edge router such as MPLS to Internet or initiating the use of a cellular connection) may be highly relevant. Upon detecting such a change, user selection component 504 may elect to send a request to the affected user(s), to determine whether a change has been noticed (better or worse).

Selecting users based on criteria that are determined by the network operator—Here, user selection component 504 may also operate as a network visibility tool that allows a network operator to understand whether the network performs at a desired level (e.g., from an application perspective). To this end, user selection component 504 could be used by the operator to validate whether a given change has the expected impact (e.g., a software upgrade) or whether a given cohort of users have the right experience (e.g., important customers, new hires, etc.).

Selecting users based on prior efforts to obtain application experience feedback—Another factor that user selection component 504 may consider is the frequency or other historical information with respect to prior efforts to garner their feedback regarding their application experience. For instance, user selection component 504 may purposely avoid asking a user for feedback, if they had previously provided feedback within a certain amount of time, so as not to annoy the user.

Etc.

As would be appreciated, a key functionality of traffic monitoring agent 502 and user selection component 504 is the mapping of network users, who may be identified by their IP addresses or other identifiers, with application user sessions (e.g., as identified by their usernames, phone numbers, email addresses, or the like). To this end, either or both of these components may interact with Network Access Control solutions such as Cisco ISE or APIs of the application itself, to resolve this this mapping. In turn, user selection component 504 may leverage this mapping to initiate the querying of users for feedback regarding their application experience and signal its selected user(s) to chatbot engine 506.

Chatbot engine 506, in various embodiments, may be responsible for presenting a chatbot to the user interface(s) 510 of the user(s) selected by user selection component 504, in various embodiments. In various embodiments, such a chatbot may be integrated directly into the online application itself or presented via a separate agent or other mechanism. For instance, assume that the online application is Webex. In such a case, chatbot engine 506 may cause a chatbot to be displayed to a selected videoconference user, such as the chatbot 600 shown in FIG. 6.

As shown in FIG. 6, chatbot 600 may be presented to a Webex user directly within the application itself. In this specific instance, Webex is both the target application (i.e., the application for feedback is being sought) and the medium platform (i.e., how we contact end users), but these may also be decoupled. For instance, chatbot engine 506 could leverage chatbot in WhatsApp to query a user regarding their O365 experience. Typically, one might want to use applications that are used in conjunction with one another. For instance, Microsoft Teams might be a better medium for O365 application experience than Webex.

Referring again to FIG. 5, chatbot engine 506 may use different strategies to collect the feedback, such as any or all of the following, in various embodiments:

Classical surveying with a 1-to-5 stars rating or similar. This is useful in case of random surveys and/or when the system has a poor estimate of the experience (e.g., upon bootstrapping the system).

Direct yes/no question—e.g., "It seems you are having a very bad time with O365. Am I correct?" This is useful when the system has a good estimate of the user experience and wants to establish trust. Ideally, such queries should be accompanied of a tip or piece of advice to resolve the situation such as "You may improve your experience by switching to cellular," "You are now using a 5G link, are you seeing any improvement in term of experience during this call?" or the like.

In further embodiments, chatbot engine 506 may also leverage natural language interactions, either initiated by the chatbot or not. For instance, the following represents an example of such an interaction:

Chatbot: "You are in a call right now. How is your experience with Webex right now?"

User: "Well, it is OK, but the video isn't great."

Chatbot: "Sorry to hear that, has it been like this since this morning?"

User: "No, it just started a few minutes ago."

Such interactions are more complex, of course, and they might not be always appropriate as they require more time and engagement from the end user. However, they can allow chatbot engine 506 to acquire more subtle information about the nature of the issues experienced by the user. Such interactions can also be initiated by the user, who may simply start to chat with the chatbot to notify it of a problem with an application. For instance, the following represents an example user-initiated chatbot interaction:

User: "Hey, SharePoint is super slow today. Not sure what's going, but opening a new document takes ages."

Chatbot: "Hello, sorry to hear that. Duly noted. For what it's worth, many other users in your area have the same problem, so this is likely to be a problem with your ISP. I have notified their support."

As shown in the previous interaction, the chatbot may also provide some further details to the end user about a given application. This can also be obtained from user selection component 504, which has a global perspective about the experience of many users.

In yet another embodiment the user may have the ability to opt-out, requesting not to be disturbed anymore, or at least for a given period.

User selection component 504 may also adapt its selection strategies to focus on a given ISP, branch office, or area, so as to better understand the nature of a problem and provide this type of contextual information to the end user. The chatbot may even follow up on a problem reported by the user, again to establish trust and increase engagement, such as by presenting the following:

Chatbot: "Thanks for reporting a problem with Salesforce earlier. I wanted to let you know that the problem seems resolved now. Most users in your area have recovered a satisfactory experience."

In yet another embodiment, a network administrator may add input to the selection strategy used by user selection component 504, to start a new campaign. For example, upon deploying a new network connectivity model (move to SD-WAN, switch to new satellite links, etc.). Such an approach would allow the network administrator to gather true user feedback, which could be highly valuable, even if the data is not used to provide feedback to an analytics engine used for prediction. In addition, this use case would also be useful by itself for visibility purposes.

Once chatbot engine 506 has collected the actual user feedback regarding their application experiences, it may associate this information with the telemetry obtained by traffic monitoring agent 502. For instance, in the case of application experience optimization process 248 being used to implement predictive application aware routing engine 412, shown previously, the feedback could be used as ground truth information for purposes of training a predictive model to predict whether the application experience is acceptable or not, given the network-level and/or application-level telemetry that is available. Such associations can also be used for purposes of presenting information to a network operator (e.g., by showing the operator the effects of a configuration change or event on the application experience of users, etc.).

Optionally, application experience optimization process 248 may also include state collector agent 508, which collects and stores more detailed state information about networking devices (e.g., edge devices, routers, switches) at the time a feedback request was sent by chatbot engine 506 to a user, in some embodiments. Such states are often of the utmost importance for models in charge of predicting and/or forecasting application QoE. In addition to the telemetry collected by traffic monitoring agent 502, which is designed to be quite sparse and lightweight, state collector agent 508 may send instructions to the various networking elements/devices (e.g., routers, switches) along the path followed by the application traffic (e.g., number of hops, types of links, links state, congestion level, error rates, etc.), to collect more detailed information about their state. Typically, such detailed information could not be collected by traffic monitoring agent 502 in the first place because of scaling issues. More specifically, traffic monitoring agent 502 will typically process all telemetry, whereas state collector agent 508 may be used selectively obtain information for flows associated with the selection by user selection component 504. In addition, state collector agent 508 may also interact with other mechanisms, to train the machine learning models of a predictive routing engine, to predict application QoE and/or by performing closed-loop control over the network. Should such mechanisms require additional input features, state collector agent 508 could be used to gather this state information.

Figure 7:
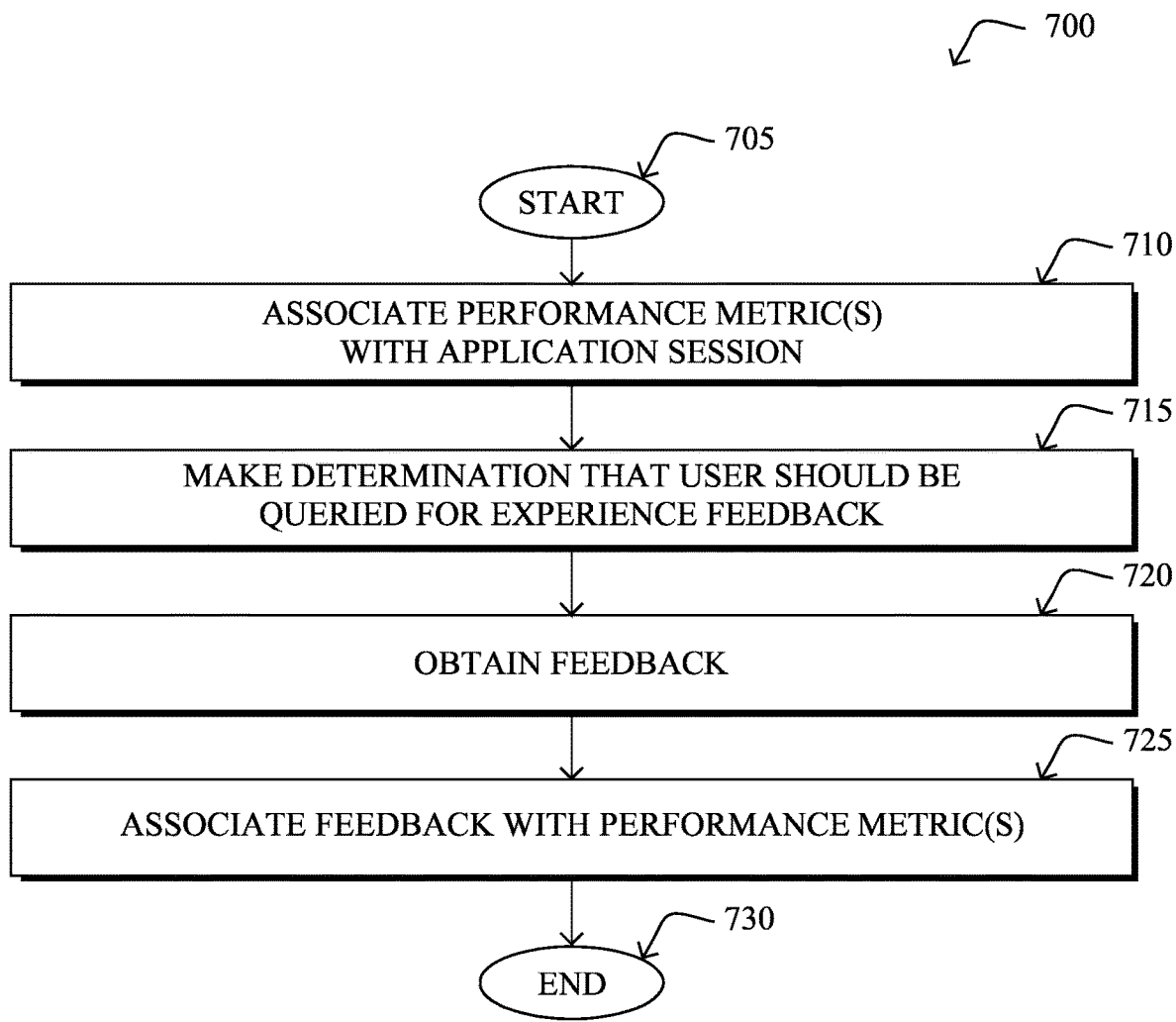
FIG. 7 illustrates an example simplified procedure for using chatbots to collect direct user feedback on application experience.

FIG. 7 illustrates an example simplified procedure 700 (e.g., a method) for using chatbots to collect direct user feedback on application experience, in accordance with one or more embodiments described herein. For example, a non-generic, specifically configured device (e.g., device 200), such as controller for a network (e.g., an SDN controller, a cloud-based device, etc.), an edge router, or other device in communication therewith, may perform procedure 700 by executing stored instructions (e.g., application experience optimization process 248). The procedure 700 may start at step 705, and continues to step 710, where, as described in greater detail above, the device may associate one or more performance metrics with a particular session of an online application. In some embodiments, the one or more performance metrics comprise path metrics, such as at least one of: packet loss, jitter, delay, or throughput. In further embodiments, the one or more performance metrics are measured by the online application, such as at least one of: a concealment time, a codec statistic, or a bitrate.

At step 715, as detailed above, the device may make a determination that a user of the online application associated with the particular session should be queried for feedback regarding their application experience. In various embodiments, the device may do so by making, based on the one or more performance metrics, a prediction that the user has perceived a degraded experience with the online application. In further embodiments, this may entail the device detecting a network configuration change or network event that may affect the particular session. In yet another embodiment, this may entail the device determining that existing application experience feedback associated with the one or more performance metrics is sparse or contradictory.

At step 720, the device may obtain, based on the determination, feedback from the user regarding their application experience, by causing a chatbot to be presented to the user and query the user for feedback regarding their application experience, as described in greater detail above. In various embodiments, the chatbot is presented to the user within the online application.

At step 725, as detailed above, the device may associate the feedback from the user regarding their application experience with the one or more performance metrics. In some embodiments, the device may use the feedback to train a prediction model to predict an application experience metric based on the one or more performance metrics. In another embodiment, the device may collect state information from one or more networking devices along a network path associated with the particular session, based in part on the feedback. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for using chatbots to collect direct user feedback on application experience, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   associating, by a device, one or more performance metrics with a particular session of an online application;
   making, by the device and using machine learning model trained to predict whether users have perceived degraded experiences with the online application based on collected performance metrics, a prediction that a user of the online application associated with the particular session has perceived a degraded experience with the online application based on the one or more performance metrics;

making, by the device, a determination that the user of the online application associated with particular session should be queried for feedback regarding their application experience based on the prediction;

obtaining, by the device and based on the determination, feedback from the user regarding their application experience, by causing a chatbot integrated into the online application to be presented to the user and query the user for feedback regarding their application experience in real-time; and associating, by the device, the feedback from the user regarding their application experience with the one or more performance metrics.

2. The method as in claim 1, wherein the one or more performance metrics comprise at least one of: packet loss, jitter, delay, or throughput.

3. The method as in claim 1, wherein the one or more performance metrics are measured by the online application.

4. The method as in claim 3, wherein the one or more performance metrics comprise at least one of: a concealment time, a codec statistic, or a bitrate.

5. The method as in claim 1, wherein the chatbot is presented to the user within the online application.

6. The method as in claim 1, wherein making the determination comprises:
  detecting, by the device, a network configuration change or network event that may affect the particular session.

7. The method as in claim 1, wherein making the determination comprises:
  determining that existing application experience feedback associated with the one or more performance metrics is sparse or contradictory.

8. The method as in claim 1, further comprising:
  using, by the device, the feedback to train a prediction model to predict an application experience metric based on the one or more performance metrics.

9. The method as in claim 1, further comprising:
  collecting, by the device, state information from one or more networking devices along a network path associated with the particular session, based in part on the feedback.

10. An apparatus, comprising:
  one or more network interfaces;
  a processor coupled to the one or more network interfaces and configured to execute one or more processes; and
  a memory configured to store a process that is executable by the processor, the process when executed configured to:
    associate one or more performance metrics with a particular session of an online application;
    make, using machine learning model trained to predict whether users have perceived degraded experiences with the online application based on collected performance metrics, a prediction that a user of the online application associated with the particular session has perceived a degraded experience with the online application based on the one or more performance metrics;
    make, a determination that a the user of the online application associated with the particular session should be queried for feedback regarding their application experience, based on the prediction;
    obtain, based on the determination, feedback from the user regarding their application experience, by causing a chatbot integrated into the online application to be presented to the user and query the user for feedback regarding their application experience in real-time; and
    associate the feedback from the user regarding their application experience with the one or more performance metrics.

11. The apparatus as in claim 10, wherein the one or more performance metrics comprise at least one of: packet loss, jitter, delay, or throughput.

12. The apparatus as in claim 10, wherein the one or more performance metrics are measured by the online application.

13. The apparatus as in claim 12, wherein the one or more performance metrics comprise at least one of: a concealment time, a codec statistic, or a bitrate.

14. The apparatus as in claim 10, wherein the chatbot is presented to the user within the online application.

15. The apparatus as in claim 10, wherein the apparatus makes the determination by:
  detecting a network configuration change or network event that may affect the particular session.

16. The apparatus as in claim 10, wherein the apparatus makes the determination by:
  determining that existing application experience feedback associated with the one or more performance metrics is sparse or contradictory.

17. The apparatus as in claim 10, wherein the process when executed is further configured to:
  use the feedback to train a prediction model to predict an application experience metric based on the one or more performance metrics.

18. A tangible, non-transitory, computer-readable medium storing program instructions that cause a device to execute a process comprising:
  associating, by the device, one or more performance metrics with a particular session of an online application;
  making, by the device and using machine learning model trained to predict whether users have perceived degraded experiences with the online application based on collected performance metrics, a prediction that a user of the online application associated with the particular session has perceived a degraded experience with the online application based on the one or more performance metrics;
  making, by the device, a determination that the user of the online application associated with particular session should be queried for feedback regarding their application experience based on the prediction;
  obtaining, by the device and based on the determination, feedback from the user regarding their application experience, by causing a chatbot integrated into the online application to be presented to the user and query the user for feedback regarding their application experience in real-time; and
  associating, by the device, the feedback from the user regarding their application experience with the one or more performance metrics.

* * * * *